E. P. NOYES.
FLUID REGULATOR.
APPLICATION FILED FEB. 1, 1911.
1,013,214.
Patented Jan. 2, 1912.
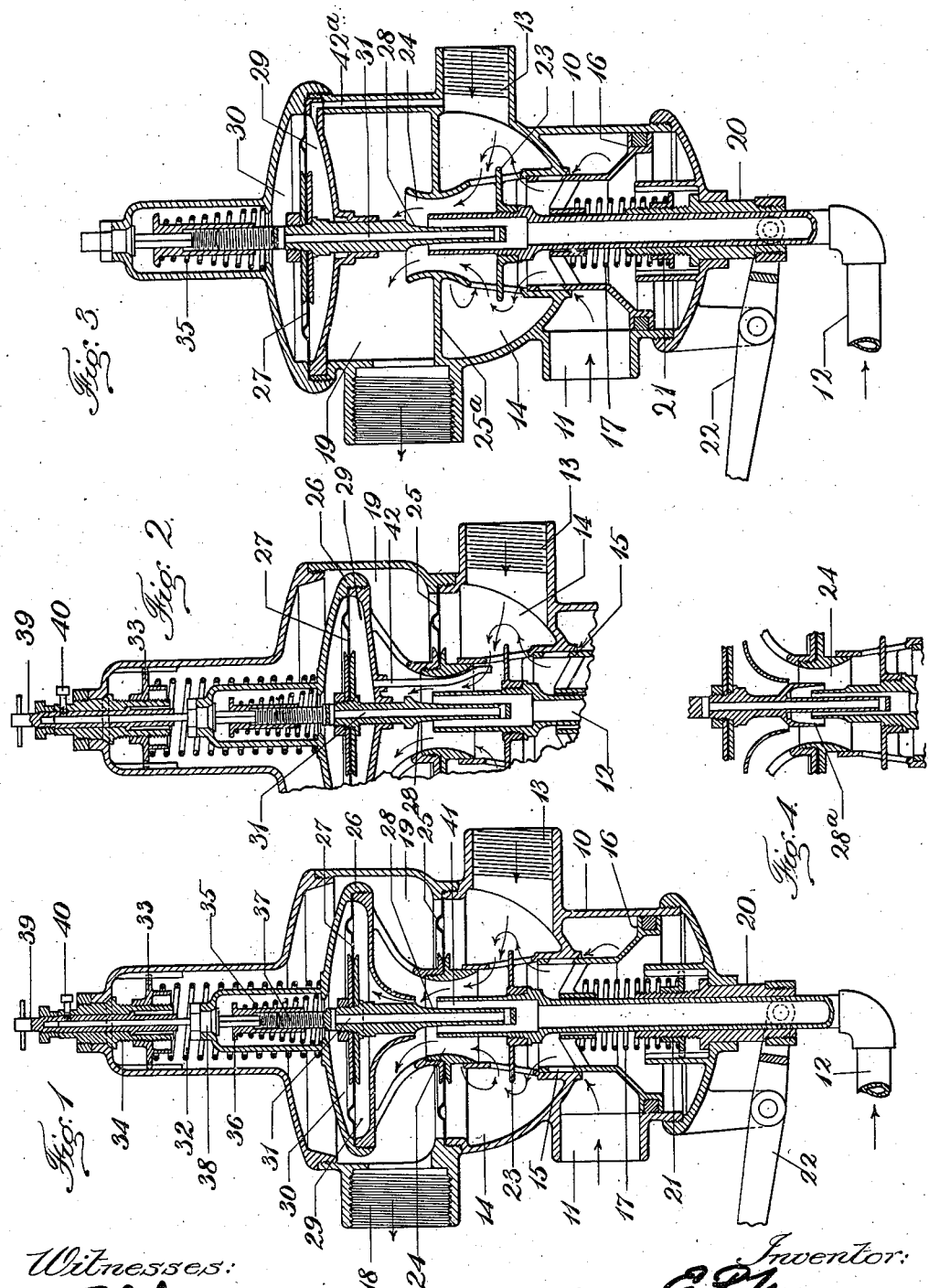

UNITED STATES PATENT OFFICE.

EDWARD P. NOYES, OF WINCHESTER, MASSACHUSETTS.

FLUID-REGULATOR.

1,013,214.   Specification of Letters Patent.   Patented Jan. 2, 1912.

Application filed February 1, 1911. Serial No. 605,896.

*To all whom it may concern:*

Be it known that I, EDWARD P. NOYES, a citizen of the United States, residing at Winchester, in the county of Middlesex and State of Massachusetts, have invented certain new and useful Improvements in Fluid-Regulators, of which the following is a specification.

This invention relates to apparatus for mixing fluids in a definite ratio, such fluids for example being air and fuel gas which it may be desired to combine in combustible proportions for a gas engine. Difficulty has heretofore been experienced in preserving the proper quantity-ratio of fluids when the pressure of either of them varies, and to some extent when the demand of the motor fluctuates. The condition of a variable air-supply pressure exists for example when the suction of the motor is applied to the performance of extraneous vacuum work such as pneumatic cleaning, or when throttle control of the motor is exercised at a point anterior to the mixing-chamber.

My object is to provide a simple and reliable regulating apparatus adapted to preserve a constant or definitely varying quantity-ratio of the fluids in the face of variations in the pressure or volume of flow of either of them. In a co-pending application, Serial No. 568,629, I have described a regulator having a similar object in view, but depending upon the establishment of equal or controllably-related pressures of the air and gas anterior to a pair of orifices maintained in a normally fixed adjustment which corresponds substantially to the desired ratio of quantities of the two fluids. My present invention however involves the automatic control of the ratio of the orifices for the respective fluids in accordance with the physical law governing the quantity-relation of fluids flowing from different sources into a common chamber.

Of the accompanying drawings, Figure 1 represents a vertical section of a fluid mixer and regulator constructed according to my invention. Fig. 2 is a fragmental section, Fig. 3 a complete section, and Fig. 4 another fragmental section showing three modifications.

The fluids may be assumed to be air and fuel gas although the main principles of the invention apply to other gaseous fluids, or to liquids, or to a gas and a liquid. Its operation is also substantially independent of the impressed pressures of either of the fluids, although for convenience of illustration it has been assumed that air is drawn through the primary air-inlet of the regulator at atmospheric pressure.

In the drawings, referring at first to Fig. 1, 10 is a casing having a primary air-inlet 11, a gas-inlet 12, and a branch air-inlet 13, which latter may be connected with a suction pipe for industrial uses such as vacuum cleaning, while the inlet 11 supplies to the motor such air for combustion as is not admitted through the inlet 13. The provision of two air-inlets 11 and 13 makes it desirable to employ in connection with the primary or atmospheric inlet 11 a device for maintaining at a substantially constant level the air pressure in the chamber 14 where the two air flows join each other, which chamber I term the anterior air chamber. Such device as here shown comprises a volume-responsive valve 15 and piston or septum 16 controlling the passage between inlet 11 and chamber 14, said piston having on its upper side the pressure in said inlet and on its lower side the pressure in said chamber, aided by the upwardly-acting or valve-closing force of an adjustable spring 17, which overbalances the weight of the valve and septum member. This device, within the limits of its volume capacity, and during the continuance of flow past its valve 15, operates somewhat as would an inwardly-opening check-valve (though without the latter's tendency to flutter) serving to maintain a substantially constant difference of pressure between inlet 11 and chamber 14, regardless of the impressed pressure in inlet 11, and in spite of variations in the supply through inlet 13, the valve 15 simply opening or closing in greater or less degree according as the volume of flow through 13 is less or greater in proportion to the demand of the motor. As the pressure in inlet 11 is assumed to be that of the atmosphere, the pressure in 14 will therefore remain at a substantially constant level during flow. The volume of air flow through the apparatus may be adjusted by a suitable throttle valve or valves (not shown) either anteriorly located in the passages 11, 13, or posteriorly located in the passage 18 leading from the mixing-chamber 19. Variable anterior throttling may also be accomplished by adjusting the tension of spring 17 and for the purpose of quickly performing such adjustment, I have shown a sleeve 20 on which the non-rotating thrust-nut 21 of the spring is screwed, together with a lever 22 for axially sliding said sleeve.

23 is a baffle in the path of the air entering anterior chamber 14 from inlet 11 for the purpose of reducing the longitudinal velocity of the air current and causing it to assume a condition of semi-static pressure before it passes into the mixing-chamber.

24 is a nozzle forming the air orifice connecting anterior chamber 14 with mixing-chamber 19, said orifice being normally fixed in size and for convenience formed in the hub-piece of a diaphragm 25 which separates said chambers. This orifice forms a resistance or constriction in the air-passage which, during air-flow establishes a pressure-difference beween chambers 14 and 19, varying in amount according to the volume of flow and serving to operate the diaphragm 25. The latter carries the casing 26 of a second diaphragm 27 attached to the gas valve 28, and it is by the differential action of these two diaphragms upon said valve that the regulative action in this instance is performed. The floating diaphragm 27 has below it a chamber 29 open to the pressure of the mixing-chamber 19 acting in an upward direction to open the valve 28, and above it a chamber 30 which receives the anterior pressure of the gas passage 12 transmitted through a duct 31 in the stem of the gas valve and acting downwardly to close said valve.

The mixing-chamber pressure, acting downwardly on diaphragm 25 to close the gas valve, is aided by the weight of casing 26 and its attachments, and the pressure of a spring 32 adjustable by means of a non-rotating thrust-nut 33 mounted on a screw 34 rotatable from the outside of the casing 10. The same fluid pressure acting upwardly on diaphragm 27 is aided by the pressure of a spring 35 adjustable by means of a thrust-nut 36 screwing upon an extension 37 of the gas valve stem, said nut engaging the squared lower end of a rod 38 whose squared upper end slides in a sleeve 39 rotatable from outside of the casing. A set-screw 40 engaging rod 38 enables the diaphragm 25 to be locked for a purpose hereinafter referred to.

The construction and operation of this regulator are based upon the physical principle that a substantially constant quantity ratio of two fluids such as air and gas flowing into a mixing-chamber such as 19, may be obtained by varying the cross-sectional area of one of the admission orifices, such as the gas orifice 41, directly as the square root of the difference between the absolute pressure of the other fluid (the air in this case) in an anterior chamber such as 14, and that of the mixture in the posterior chamber 19, and inversely as the square root of the difference between its own absolute supply pressure in the anterior pipe or chamber 12, and the absolute pressure in said mixing-chamber 19. This assumes that the posterior pressure in 19 is greater than about 60% of the respective anterior pressures in 14 and 12, that the fluid temperatures remain substantially uniform, and that the skin friction of the passage walls is negligible. The operation of the regulator need not of course exhibit an exact conformity to this law in order to obtain the desired result of substantially uniform or controllably varied proportions of the two fluids.

When the posterior or mixture pressure is less than .6 of the anterior air pressure and less than .6 of the gas supply pressure, the law is somewhat simplified, and I provide for this situation by a modified structure hereinafter referred to. When the posterior or mixture pressure is greater than .6 of the anterior air pressure, but less than .6 of the gas-supply pressure, it is obviously possible to reduce the latter by an arbitrary throttle or an automatic reducing valve in the pipe 12 in order to have the regulator work in substantial conformity with the law as stated above. This will be readily understood without illustration.

In the operation of Fig. 1 the gas valve 28 receives a differential motion in obedience to the pressure difference between the chambers 14 and 19 on the one hand, and that between the chambers 30 and 29 on the other hand, the valve opening wider as the former difference increases and closing as the latter difference increases. The two factors determining the relation of the gas-orifice area to these respective pressure-differences are, the relation of the valve-travel to that of either diaphragm, and the shape of the valve or its seat. Either factor may be controlled, but since I have in this instance attached the valve 28 directly to the diaphragm 27, I prefer to so shape said valve that its orifice-changes are as the square root of its longitudinal travel. When the reduction of pressure in the normal operation of the regulator is so great that the mixing-chamber pressure is less than about 60% of the anterior air or gas pressure, the law of flow control by orifice variation becomes simplified, and the gas orifice should then vary directly as the anterior air pressure, and inversely as the anterior gas pressure. To provide for this condition the apparatus of Fig. 1 might be modified as shown in Fig. 2, in which the chamber 29 on the lower side of diaphragm 27, instead of receiving the pressure of mixing-chamber 19, receives that of the anterior air-chamber 14 through a duct 42, its upper side remaining subject to the anterior gas pressure. Diaphragm 25 should then be locked rigid by the set-screw 40, leaving diaphragm 27 solely in control of the valve. In other words diaphragm 25 may under these conditions be dispensed with as I have shown in Fig. 3, wherein a fixed partition 25ª is substituted for said diaphragm and the edges of diaphragm 27 are supported by the casing. Anterior air pressure is led to the chamber 29 through a duct 42ª, and anterior gas-pressure, as before, is led to chamber 30 above the diaphragm, through duct 31. The shape of valve 28 in this case is preferably such that its gas-orifice area variations are directly proportional to the travel of the valve. It will be noted that Fig. 3 possesses the feature in common with Figs. 1 and 2, of causing the anterior air and gas pressures to act in opposite directions on a diaphragm structure controlling the gas valve, the former pressure tending to open the valve and the latter to close it.

Fig. 4 shows a modification in which the gas valve 28ª is cup-shaped so as to throw the gas flow downward in a direction counter to the air flow in order to improve the mixing.

Various other modifications may be made without departing from my invention. For example, while I have described the gas valve as being automatically operated, it will be understood without special portrayal that a valve controlling the air orifice might be operated in a substantially parallel fashion to secure the same result.

I claim,—

1. A regulator comprising a mixing-chamber having inlets for two different fluids, and a mixture-outlet, a valve controlling one of said inlets, and means for so applying the pressure of the fluid anterior to said valve as to close the latter, and for so applying the pressure of the other fluid anterior to its inlet as to open said valve.

2. A fluid-regulator comprising a mixing-chamber having restricted air and fuel inlets, a valve controlling the fuel inlet, and a septum structure controlling said valve and subject differentially to the air and fuel pressures anterior to said inlets, the former pressure tending to open said valve and the latter pressure tending to close it.

3. A regulator comprising a mixing-chamber having inlets for two different fluids and a mixture-outlet, a valve controlling one of said inlets, a multiple-septum structure controlling said valve, and means for so applying the anterior pressures of the respective fluids and the mixing-chamber pressure to said septum structure that said valve varies the area of its inlet inversely as a function of the difference between the anterior pressure of the fluid controlled by the valve and the mixing-chamber pressure, and directly as the corresponding function of the difference between the anterior pressure of the other fluid and the mixing-chamber pressure.

4. A fluid-regulator comprising a mixing-chamber having inlets for two different fluids and a mixture-outlet, a valve controlling one of said inlets, and two septums differentially connected with said valve, one of said septums being subject in opposite directions to the anterior air pressure and the mixing-chamber pressure tending respectively to open and close said valve, and the other being subject in opposite directions to the anterior gas pressure and the mixing-chamber pressure tending respectively to close and open said valve.

5. A fluid-regulator comprising a mixing-chamber having restricted air and gas inlets and a mixture-outlet, a valve controlling said gas-inlet, a septum attached to said valve and subject differentially to the anterior gas pressure and the mixing-chamber pressure tending respectively to close and open said valve, and a second septum carrying the first-said septum and subject differentially to the anterior air pressure and the mixing-chamber pressure tending respectively to open and close said valve.

6. A regulator comprising a mixing-chamber having inlets for two different fluids and a mixture-outlet, a valve controlling one of said inlets, a diaphragm structure controlling said valve and subject differentially to the anterior pressures of the respective fluids, an anterior chamber for one of said fluids having a plurality of inlet passages, and a valve-and-septum structure controlling one of said passages and subject differentially to the pressures anterior and posterior to it tending respectively to open and close the said passage.

In testimony whereof I have hereunto set my hand in the presence of two subscribing witnesses, this 30th day of January 1911.

EDWARD P. NOYES.

Witnesses:
R. M. PIERSON,
EDWARD E. BLACK.